(12) United States Patent
Prosyk

(10) Patent No.: US 9,008,469 B2
(45) Date of Patent: Apr. 14, 2015

(54) MACH-ZEHNDER OPTICAL MODULATOR HAVING AN ASYMMETRICALLY-LOADED TRAVELING WAVE ELECTRODE

(71) Applicant: Teraxion Inc., Quebec (Quebec) (CA)

(72) Inventor: Kelvin Prosyk, Ottawa (CA)

(73) Assignee: Teraxion Inc., Quebec (Quebec) (CA)

( * ) Notice: Subject to any disclaimer, the term of this patent is extended or adjusted under 35 U.S.C. 154(b) by 0 days.

(21) Appl. No.: 14/075,854

(22) Filed: Nov. 8, 2013

(65) Prior Publication Data

US 2014/0153860 A1 Jun. 5, 2014

Related U.S. Application Data

(60) Provisional application No. 61/724,796, filed on Nov. 9, 2012.

(51) Int. Cl.
*G02F 1/035* (2006.01)
*G02F 1/225* (2006.01)

(52) U.S. Cl.
CPC .............. *G02F 1/225* (2013.01); *G02F 1/2257* (2013.01); *G02F 2201/127* (2013.01)

(58) Field of Classification Search
CPC ................... G02F 2001/212; G02F 2002/008; G02F 2203/50; G02B 6/2935; H01S 5/062
USPC ..................... 385/1, 2, 3, 31, 45, 50
See application file for complete search history.

(56) References Cited

U.S. PATENT DOCUMENTS

| | | | | |
|---|---|---|---|---|
| 6,647,158 B2 * | 11/2003 | Betts et al. | | 385/2 |
| 7,027,668 B2 | 4/2006 | Tavlykaev et al. | | |
| 7,082,237 B2 * | 7/2006 | Walker et al. | | 385/40 |
| 7,272,271 B2 * | 9/2007 | Kaplan et al. | | 385/3 |
| 7,321,702 B2 * | 1/2008 | Akiyama et al. | | 385/3 |
| 7,382,943 B1 * | 6/2008 | Heaton | | 385/3 |
| 7,394,950 B2 * | 7/2008 | Sugiyama | | 385/8 |
| 8,380,017 B2 * | 2/2013 | Sugiyama | | 385/3 |
| 8,472,759 B2 * | 6/2013 | Sugiyama | | 385/3 |
| 8,655,116 B2 * | 2/2014 | Ishimura et al. | | 385/2 |
| 8,849,071 B2 * | 9/2014 | Kissa et al. | | 385/3 |
| 2006/0056766 A1 * | 3/2006 | Sugiyama | | 385/40 |
| 2013/0209023 A1 * | 8/2013 | Prosyk | | 385/3 |

OTHER PUBLICATIONS

Klein et al., 1.55µm Mach-Zehnder Modulators on InP for optical 40/80 Gbit/s transmission networks, OFC/NFOEC 2006, paper TuA2.
Walker, R.G., High-Speed III-V Semiconductor Intensity Modulators, IEEE J Quant. Elect., vol. 27(3), pp. 654-667, 1991.

* cited by examiner

*Primary Examiner* — Ellen Kim
(74) *Attorney, Agent, or Firm* — Hovey Williams LLP

(57) ABSTRACT

A Mach-Zehnder optical modulator with a travelling wave electrode has a signal transmission line conductor (S) carrying an input electrical signal, and two ground transmission line conductors (G1 and G2) providing a return path for the electrical signal. The signal transmission line conductor is positioned between the first and second ground lines, and the first and second optical waveguide branches are positioned between the signal transmission line conductor and the first ground line. The modulator therefore has a GSG structure providing an asymmetrically-loaded configuration.

4 Claims, 8 Drawing Sheets

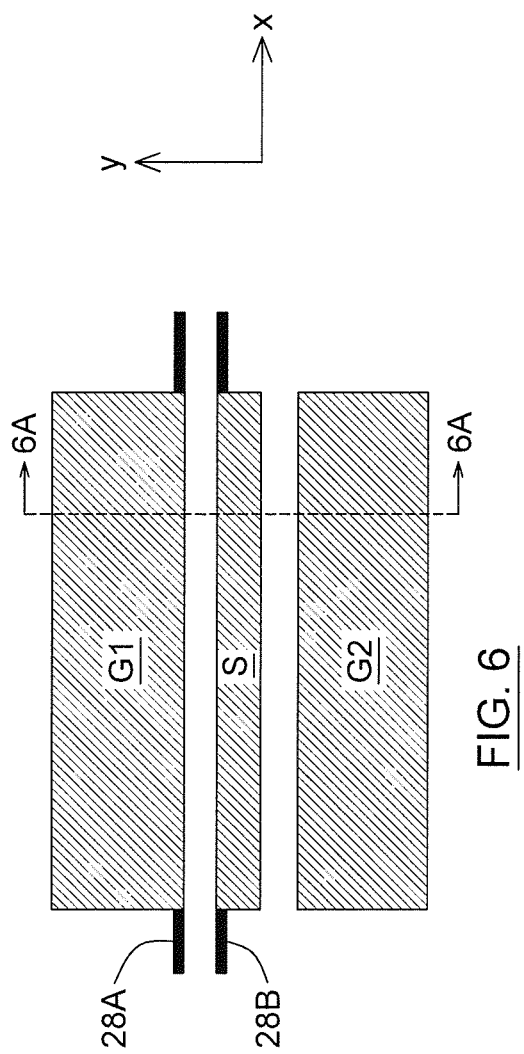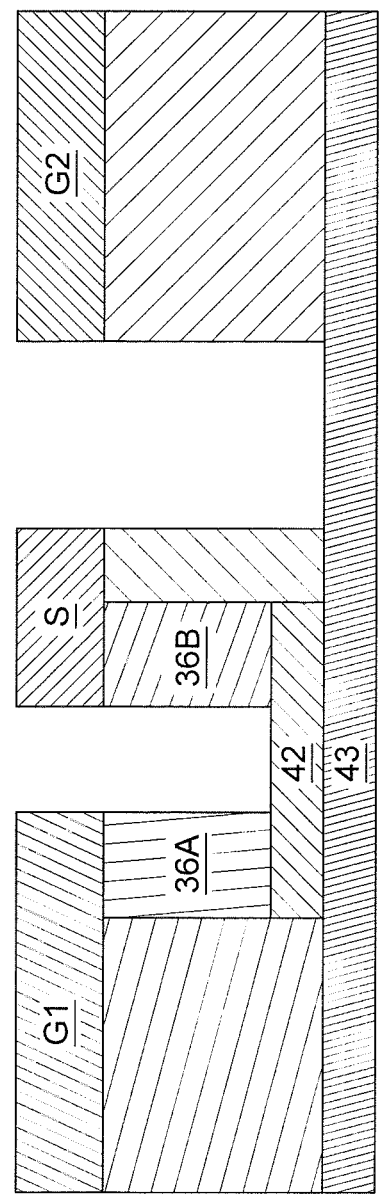

MACH-ZEHNDER OPTICAL MODULATOR HAVING AN ASYMMETRICALLY-LOADED TRAVELING WAVE ELECTRODE

RELATED APPLICATION

This application claims priority benefit of a provisional application entitled, "MACH-ZEHNDER OPTICAL MODULATOR HAVING AN ASYMMETRICALLY-LOADED TRAVELING WAVE ELECTRODE," Ser. No. 61/724,796, filed Nov. 9, 2012 and incorporated by reference herein in its entirety.

FIELD OF THE INVENTION

The present invention generally relates to optical modulators, and more particularly concerns a Mach-Zehnder optical modulator having an asymmetrically-loaded traveling wave electrode.

BACKGROUND

Optical modulators have been employed for many years in the field of optical communications to accept modulated data in electrical format (typically radio frequency or RF) and transfer the data onto an optical carrier. In a Mach-Zehnder optical modulator 20, as generally shown in FIG. 1A (PRIOR ART), a beamsplitter 22 divides the laser light from an input optical waveguide 24 into two optical beams propagating in parallel waveguides defining optical paths 28A and 28B, at least one of which having a phase modulator in which the refractive index is a function of the strength of the locally applied electric field. In the example of FIG. 1A light in both optical paths 28A, 28B undergoes a phase modulation, although in other configurations the refractive index in only one of the optical paths could be modulated with respect to the other. The beams are then recombined by an output optical combiner 26. Changing the electric field on the phase modulating paths determines whether the two beams interfere constructively or destructively when recombined, and thereby controls the amplitude or intensity of the exiting light. In some configurations, the phase of the exiting light can be controlled via a variety of means such as by manipulating the phase modulation signal, or through design.

In the configuration shown in FIG. 1A, the modulating electric field is provided by a segmented travelling wave electrode 21 (or TWE) that consists of two or more transmission line conductors 30A, 30B oriented substantially parallel to the optical paths 28A, 28B, and a plurality of pairs of waveguide electrodes 32A, 32B. Each waveguide electrode 32A, 32B is connected one of the transmission line conductors 30A, 30B via a corresponding tap or bridge conductor 34A, and 34B. Each bridge conductor 34A, 34B branches out of one of the transmission line conductors 30A, 30B in a direction substantially perpendicular to the optical path 28A, 28B. The transmission line conductors 30A, 30B convey an RF signal along an RF path that is substantially parallel to the optical paths 28A, 28B.

The configuration shown in FIG. 1A is known as a Mach-Zehnder modulator operated in "push-pull" mode is referred to as a series push-pull travelling wave electrode, after Klein et al., "1.55 µm Mach-Zehnder Modulators on InP for optical 40/80 Gbit/s transmission networks", OFC/NFOEC 2006, paper TuA2, and described in further detail by R. G. Walker, "High-Speed III-V Semiconductor Intensity Modulators", IEEE J. Quant. Elect., vol. 27(3), pp. 654-667, 1991. In a series push-pull configuration, a single voltage signal or field is used to phase modulate the interfering signals in the two arms in anti-phase. Each pair of waveguide electrodes 32A, 32B, as shown in FIG. 1A, impart a phase change to the optical wave in the waveguide 28A, 28B and also act as a pair of capacitors in series and as a load on the main transmission line conductors 30A, 30B.

A travelling wave electrode Mach-Zehnder optical modulator can be driven using a single RF signal input, as illustrated in FIG. 1B (PRIOR ART). In the illustrated example, the travelling wave electrode 21 of the modulator 20 includes a first transmission line conductor conveying the input electrical signal, therefore acting as a signal transmission line conductor (S), and a second transmission line conductor connected to a ground reference, therefore acting as a ground transmission line conductor (G). This modulator configuration is single-end as it includes a single signal transmission line and is sometimes referred to as an SG modulator (also known as coplanar strip). In the specific embodiment shown in FIG. 1B, the electrical modulation signal is provided by an RF voltage source 50 having a single signal line 52 and a ground line 54, both embodied by a RF waveguide such as a coaxial cable. The signal line 52 of the driver 50 is connected to the signal transmission line conductor S of the travelling-wave electrode 21, whereas the ground line 54 of the driver 50 is connected to the ground transmission line conductor G of the travelling-wave electrode 21. A nominal terminal load 56 (e.g., 50 ohms) joins the distal ends of the S and G transmission lines. The modulation voltage across the arms of the travelling wave electrode is the difference between the signal voltage and ground.

It should be noted that other types of RF drives are known in the optical telecommunications industry, requiring other arrangements of transmission line conductors in the modulator. For example, the prior art includes optical modulators with differential-drive GSGSG and GSSG formats.

In some applications, single end driving may be advantageous over other types of drive, such as differential drive. Single-end travelling wave electrode Mach-Zehnder optical modulators are known in the art to provide broadband high frequency operation. In addition, a single-end drive can reduce the size of packaging, since only one high-frequency signal feed-through is necessary to connect to the optical modulator. Routing of differential signals can indeed be challenging, as it is preferred that the two opposite signals that comprise the differential signal be of opposite sign, but otherwise identical.

The SG format of prior art single end travelling wave electrode optical modulators, however, suffers from a major drawback. The signal transmission line conductor S is not shielded from the external environment by a grounded conductor. Parasitic interaction between the signal and the environment can negatively impact performance. A large buffer distance is required between the optical modulator and any neighboring environmental features (e.g., metal, dielectric interfaces, etc.), especially on the side of the exposed signal conductor. If the optical modulator is monolithically integrated with other components, this places a limit on how densely the components can be placed. Dense integration is desirable because it enables miniaturization and reduced manufacturing costs.

There remains a need, therefore, for a modulator configuration that alleviates at least some of the drawback of the prior art.

SUMMARY

In accordance with one aspect of the present invention, there is provided a Mach-Zehnder optical modulator for modulating an input optical beam according to an electrical modulation signal. The Mach-Zehnder modulator includes an optical structure dividing the input optical beam into two optical beam components propagating in two optical waveguides branches, respectively, and recombining said optical beam components downstream the optical waveguides branches.

The Mach-Zehnder modulator further includes a travelling wave electrode modulating a relative phase of the optical beam components. The travelling wave electrode comprising:

(a) only one signal transmission line conductor, coupled to one of the optical waveguide branches and conveying the input electrical signal;

(b) a first ground transmission line conductor coupled to the other one of the optical waveguide branches and providing a first return path for the input electrical signal; and (c) a second ground transmission line conductor providing a second return path for the input electrical signal.

The signal transmission line conductor is positioned between the first and second ground transmission line conductor, and the first and second optical waveguide branches are positioned between the signal transmission line conductor and the first ground transmission line conductor.

Embodiments of the invention provide a Mach-Zehnder optical modulator with an asymmetrically-loaded GSG traveling wave electrode. This design maintains the advantages of electrical isolation inherent in differential GSSG or GSGSG modulator architectures, but keeps the routing and packaging advantages of single-end optical modulators.

These and other advantages, features, and objects of the present invention will be more readily understood in view of the following detailed description and the drawings.

BRIEF DESCRIPTION OF THE DRAWINGS

FIG. 6 is a schematic top view of a portion of an asymmetrically-loaded Mach-Zehnder optical modulator according to one embodiment where the signal transmission line conductor and the first ground transmission line conductor are directly coupled to the waveguide branches; FIG. 6A is a cross-sectional view taken along line A of FIG. 6.

DETAILED DESCRIPTION OF EMBODIMENTS

Embodiments of the invention relate to Mach-Zehnder optical modulators. As one skilled in the art will readily understand, a Mach-Zehnder modulator is a device which induces a phase shift between two components of an input optical light beam in order to modulate the optical properties of the input light beam in accordance with interferometric principles. It will be readily understood that Mach-Zehnder modulators may have a variety of configurations and that the particular configurations described herein are provided by way of example only.

The input optical beam to be modulated may have any optical characteristic appropriate for the application to which is destined the optical modulator. Optical modulators are used for in a variety of contexts, for example modulating light from a continuous wave (CW) laser source with no prior modulation encoded upon it, or further modulate in phase and/or amplitude an optical signal formed from a series of regular pulses at intervals determined by the data rate. Since the optical signal "returns to zero" at the end of every unit interval, the format is often referred to as "RZ". In another example, an optical modulator may be used to impose a modulation on a series of pulses as above, except that consecutive pulses are 180 degrees out of phase at the optical carrier frequency. In the Fourier spectrum, this has the effect of suppressing the optical carrier component, and is sometimes referred to as a "carrier suppressed return-to-zero" or CS-RZ modulation format. Of course, it will be readily understood that the above examples are given for illustrative purposes only.

Figure 1A:
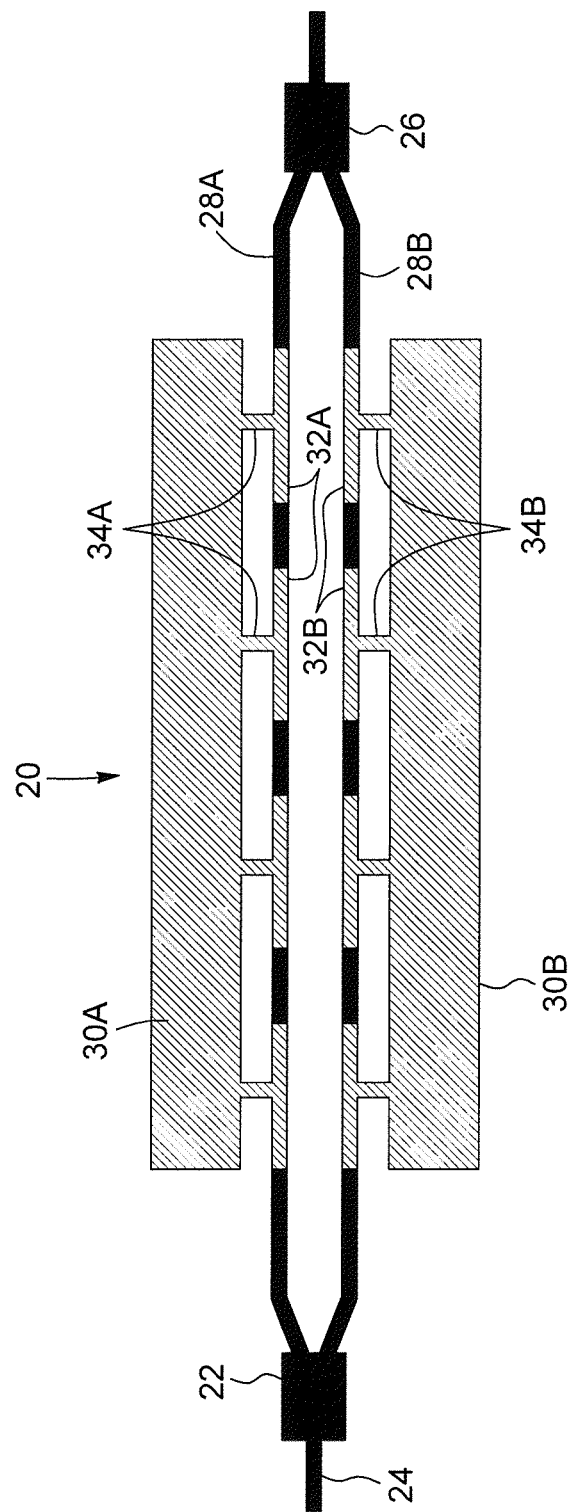
FIG. 1A (PRIOR ART) is a simplified schematic top view of a Mach-Zehnder optical modulator with a traveling wave electrode operated in differential drive.
Figure 1B:
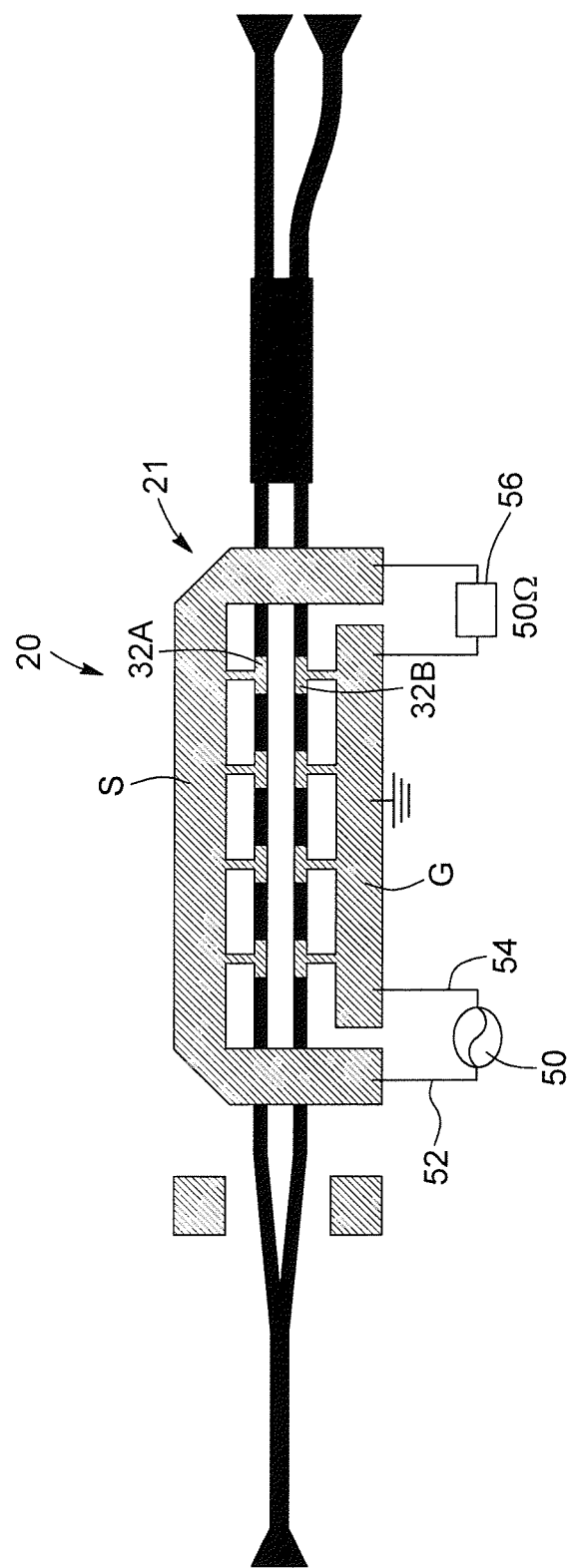
FIG. 1B (PRIOR ART) is a simplified schematic top view of a Mach-Zehnder optical modulator with a traveling wave electrode operated in single-end drive.
Figure 2A:
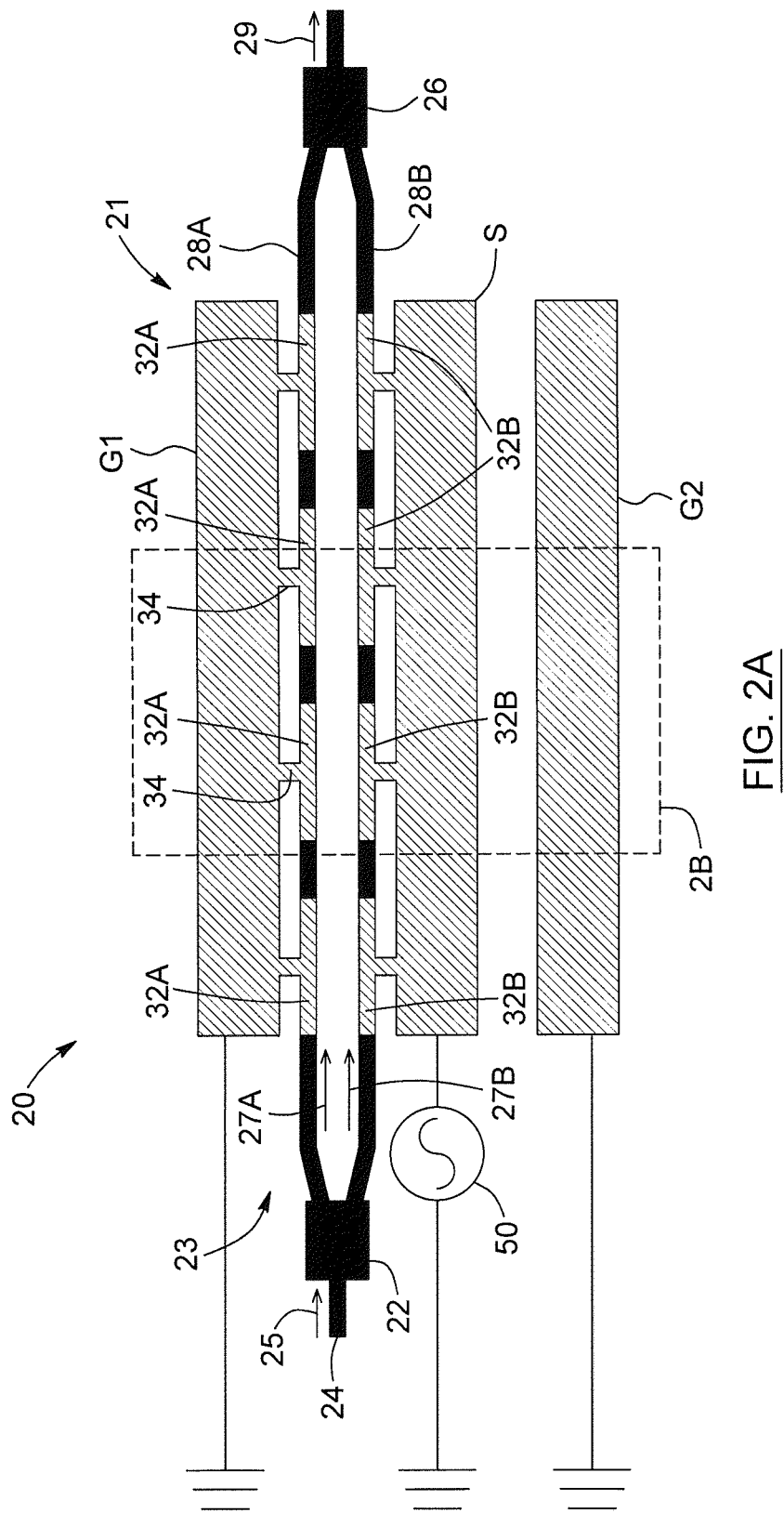
FIG. 2A is a simplified schematic top view of an asymmetrically-loaded Mach-Zehnder optical modulator according to one embodiment of the present invention.

With reference to FIG. 2A, there is shown a schematic top view of a Mach-Zehnder optical modulator 20 according to one embodiment. The optical modulator includes an optical structure 23 receiving the input optical beam 25 and dividing this input optical beam 25 into two optical beam components 27A, 27B propagating in two optical waveguide branches 28A, 28B, respectively. The optical structure 23 then recombines the optical beam components 27A, 27B downstream the optical waveguide branches 28A, 28B, resulting in an output optical beam 29. In some applications dual optical output beams can be provided, such as for example shown with respect to prior art configurations in FIG. 1B. In the illustrated configuration of FIG. 2A, the input optical beam is carried by an input waveguide 24, and a beam splitter 22 divides the input optical beam into the two optical beam components. The two optical beam components are recombined after propagation through the optical waveguide branches 28A, 28B by an output optical combiner 26.

In some embodiments, the optical structure 23 is defined by a semiconductor structure comprising a plurality of layers patterned to provide the desired light guiding characteristics. In one example, the optical structure may be defined by superposed layers of varying composition, such as the compound semiconductor indium gallium arsenide phosphide (InGaAsP) in different proportions of the constituent elements; such compositional differences resulting in differences in the index of refraction between the layers. The differences in index of refraction serve to confine the light in a given direction. In some embodiments, light confinement may be additionally achieved by etching away material in some regions creating a semiconductor-to-air or dielectric-to-air interface, again resulting in an index contrast. Etched interfaces can also be covered with the application of a different material, for example etching away a portion to create a semiconductor-to-air interface, and then replacing the material that was etched away with a dielectric, to form a semiconductor-to-dielectric interface. In other implementations superposed doped and undoped layers or differently doped layers of a same material such as lithium niobate may be provided and patterned to form ridge waveguiding constructions. As one skilled in the art will readily understand, optical structures appropriate for optical modulators may be made of a variety of materials and may be designed according to various patterns.

Typically, the beamsplitter may be embodied by multimode interference device (MMI), a directional coupler, a Y-junction splitter, or the like. Preferably, the beamsplitter divides the input light beam such that the two resulting optical beam components have a same optical power. Furthermore, the optical beam components are coherent, that is, they have a constant relative phase.

The combiner 26 may be embodied by a multimode interference (MMI) device or the like. A MMI relies on a transition from a narrow single mode guiding structure to a wider, multi-mode guiding structure. The multimode section is judiciously designed so that various modes excited by the inputs 28A and 28B combine together in the desired fashion at the output 29.

Of course, it will be readily understood that the optical structure 23 may include additional components guiding, shaping or otherwise acting on the light traveling therein without departing from the scope of the invention.

The optical mode of light travelling in each optical waveguide branch 28A, 28B has an optical group index which is determined by the geometry and materials of the optical waveguide branches 28A, 28B. As is well known to those skilled in the art, the refractive index of an optical medium can be modified through the application of an electrical field. In a Mach-Zehnder configuration, this principle is used to adjust the relative phase of the optical beam components guided along the optical waveguide branches, thereby determining whether these optical beam components will interfere constructively or destructively once recombined.

Still referring to FIG. 2A, the Mach-Zehnder modulator therefore includes a travelling wave electrode 21 modulating the relative phase of the optical beam components as they propagate along the optical waveguide branches 28A, 28B.

The travelling wave electrode 21 includes only one signal transmission line conductor S, coupled to one 28A of the optical waveguide branches and conveying the input electrical signal. The signal transmission line conductor S preferably extends longitudinally parallel to the optical waveguide 28A it is coupled to, along a substantial portion of the length thereof. The travelling-wave electrode 21 further includes a first ground transmission line conductor G1 coupled to the other one of the optical waveguide branches 28B. The first ground transmission line conductor G1 provides a first return path for the input electrical signal. The first ground transmission line conductor G1 preferably extends longitudinally parallel to the optical waveguide branch 28B it is coupled to, along a substantial portion of the length thereof. The travelling wave electrode 21 further includes a second ground line G2, providing a second return path for the input electrical signal.

In the illustrated embodiment, the RF signal circulating in the transmission line electrodes is provided by an RF voltage source 50 having a single signal output.

The signal transmission line conductor S and first and second ground transmission line conductors G1 and G2 may be embodied by any electrode structures of suitable shape and construction. In typical embodiments, a metallic layer is deposited over the semiconductor structure embodying the optical structure 23, and patterned to define the transmission lines S, G1 and G2. The metallic layer may for example be made of gold, aluminum, copper, a multilayer stack comprising titanium, platinum and gold, or the like.

By "coupled" it is understood that the signal transmission line conductor S and the first ground transmission line conductor G1 are disposed relative to the corresponding optical waveguide branch 28A, 28B such that the propagation of the electrical signal therealong generates a local electrical field within one or both of the optical waveguide branches 28A, 28B suitable to affect its refractive index, thereby changing the light transmission properties of the corresponding waveguide in accordance with the input electrical signal. As mentioned above, this allows a change in the relative phase of the optical beam components directly related to the electrical signal.

In the illustrated embodiment, the signal transmission line conductor S and first ground transmission line conductor G1 are coupled to the respectively associated optical waveguide branches 28A, 28B through a plurality of pairs of waveguide electrodes 32. The waveguide electrodes 32A, 32B of each pair are positioned adjacent the corresponding optical waveguide branch 28A or 28B. In the illustrated design, the waveguide electrodes 32A, 32B extend over the corresponding waveguide branch. Each waveguide electrode 32A, 32B is electrically connected to either the signal transmission line conductor S or to the first transmission ground line G1. In the illustrated embodiment, these connections are provided by bridge conductors 34, preferably embodied by a metallic segment linking the corresponding electrodes.

In the illustrated configuration, the Mach-Zehnder modulator 20 operates in "push-pull" mode, where a single voltage signal or field is used to phase modulate the optical beam components in the two waveguide branches in anti-phase. In a series push-pull configuration, each pair of waveguide electrodes 32A, 32B also act as a pair of capacitors in series and as a load on the corresponding transmission lines S and G.

Figure 2B:
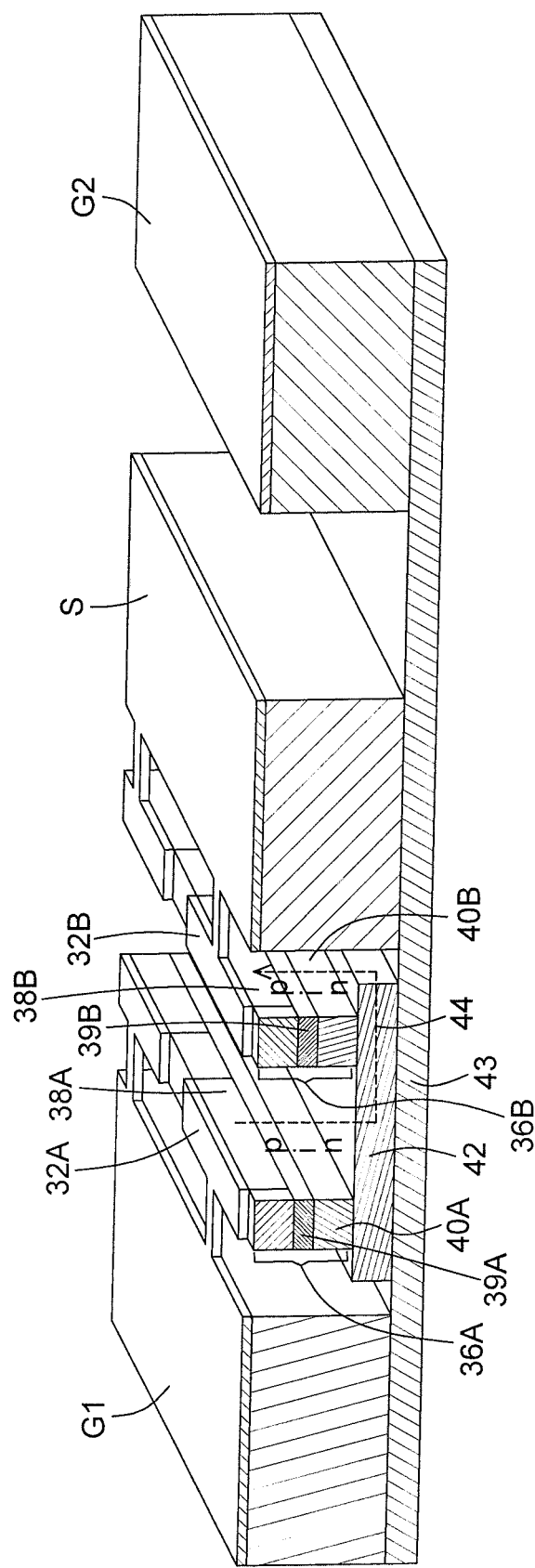
FIG. 2B is a schematized elevation side view of a portion B of the optical modulator of FIG. 2A.

FIG. 2B is an elevation view of a section of the optical modulator of FIG. 2A, showing two pairs of waveguide electrodes 32A, 32B. Each waveguide electrode 32A, 32B extends over a p-i-n junction 36A, 36B, formed within the corresponding waveguide branch. The p-layer 38A, 38B is in contact with the corresponding waveguide electrode 32A, 32B and the n-layer 40A, 40B is in contact with a common conducting backplane 42. The i-layer 39A, 39B contains a series of layers of InGaAsP of varying composition that acts as the waveguiding core. The entire structure extends on an insulating substrate 43. When an instantaneous change is applied in the voltage difference between the signal transmission line conductor S and the first ground transmission line conductor G1, a RF current 44 flows from the highly p-doped contact material 38A beneath waveguide electrode 32A, through the corresponding p-i-n junction 36A and the common conducting n-backplane 42, and up through the opposite p-i-n junction 36B. The direct current (DC) bias voltage of the backplane 42 is typically fixed by an external DC voltage source (not shown).

The present invention is however not limited to periodically loaded series push-pull configurations such as shown in the previously discussed embodiments. Referring to FIGS. 6 and 6A, there is shown an alternative embodiment where the signal transmission line conductor S and first ground transmission line conductor G1 are elongated electrode structures having an edge extending contiguous to the corresponding waveguide branch 28A, 28B in the X-Y plane. Such an embodiment operates similar to the embodiment of FIG. 2B, except that the index modulation and the RF current flow are continuous along the length of the optical waveguide branches 28A, 28B, rather than being confined to periodic waveguide electrodes.

Referring back to FIG. 2A, it will be apparent that the signal transmission line conductor S is positioned between the first and second ground transmission line conductors G1 and G2, whereas the first and second optical waveguide branches 28A, 28B are positioned between the signal transmission line conductor S and the first ground transmission line conductor G1. The modulator therefore has a GSG structure providing an asymmetrically-loaded configuration, as the loading capacitance of the travelling-wave electrode 21 is asymmetrically placed in only one of the S-G gaps of the GSG structure.

Figure 3:
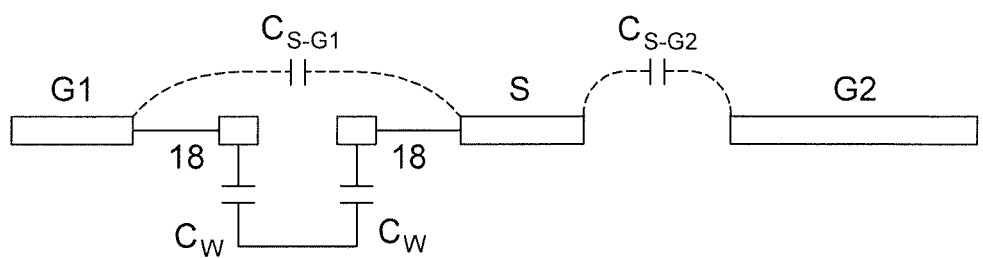
FIGS. 3 and 4 are schematic diagrams of equivalent circuits to the configuration of FIG. 2A showing asymmetrical capacitive loading between the signal transmission line conductor S and the two ground transmission line conductors G1 and G2.
Figure 4:
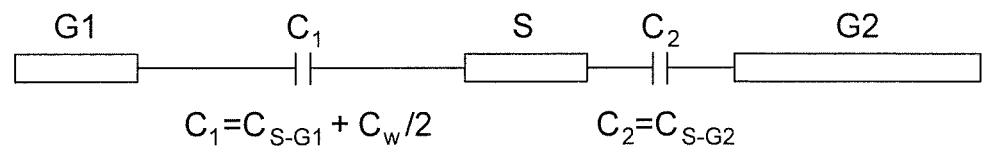

FIGS. 3 and 4 are schematic diagrams of equivalent circuits to the design of FIG. 2A, illustrating the asymmetrical average capacitive loading per unit length between the signal line S and the two ground lines G1, G2, that is, the average effect of the periodic waveguide electrodes. In this regard, one skilled in the art will understand that the shorter the electrodes and the larger the gap in between, the lower the average capacitance per unit length. As shown in FIG. 3, effective capacitances exist between signal line S and each of the two ground lines G1, G2, respectively designated as $C_{S-G1}$ and $C_{S-G2}$. In addition, two loading capacitances exist in series between the waveguide electrodes 32 and their respective optical waveguides, which are designed as $C_W$ in FIG. 3. $C_{S-G1}$ is in parallel with the series combination of the two waveguide capacitances, thus resulting in a net capacitance $C_1$ between the signal transmission line conductor S and the first ground transmission line conductor G1 equal to $C_{S-G1} + C_W/2$, as shown in FIG. 4. In contrast, the capacitance $C_2$ between the signal transmission line conductor S and the second ground transmission line conductor G2 is $C_{S-G2}$, as previously mentioned.

Figure 7:
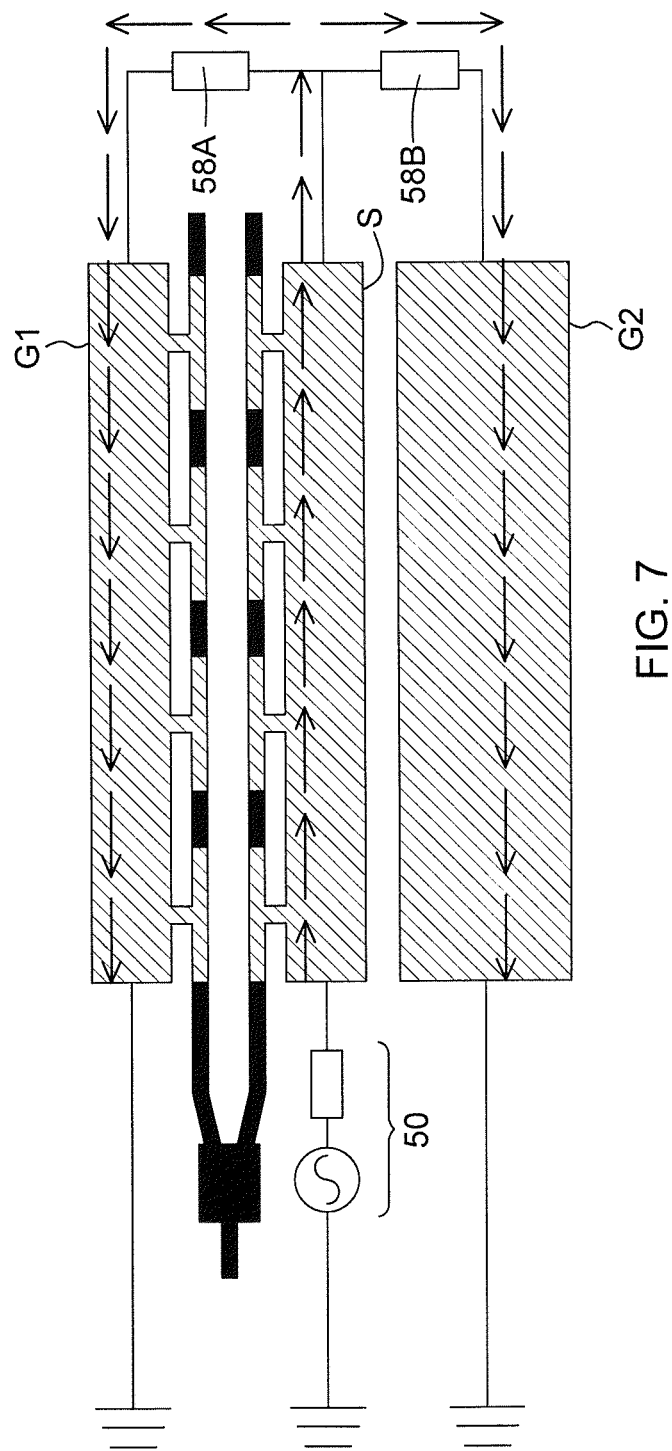
FIG. 7 is a diagram illustrating current flow in a configuration of a Mach-Zehnder modulator such as shown in FIG. 2A.

Referring to FIG. 7, the current flow in the configuration of FIG. 2A is schematically illustrated. The simplified representation of FIG. 7 is an instantaneous snapshot of the current flow pattern for low frequency, disregarding the RF displacement currents through the p-i-n junctions in the waveguides. As can be observed, both ground transmission line conductors G1 and G2 provide return paths for the RF current circulating through the one signal transmission line electrode S. As will be readily understood by one skilled in the art, although not specifically illustrated in all drawings herein, parallel termination loads 58A, 58B preferably connect the signal transmission line conductor S with the first and second ground transmission line conductors G1 and G2, respectively, on the output side of the modulator. The termination loads 58A, 58B are selected to match an input impedance of the RF source 50. In one typical example, the RF voltage source 50 has a 50 Ohm impedance load (shown explicitly in this illustration), and the terminations loads 58A and 58B are 100 Ohm resistors, providing the desired impedance matching in the illustrated parallel configuration. It will be noted that in different embodiments, the termination loads 58A, 58B could have dissimilar values, as long as the resulting combined load provides the desired impedance matching.

Figure 5:
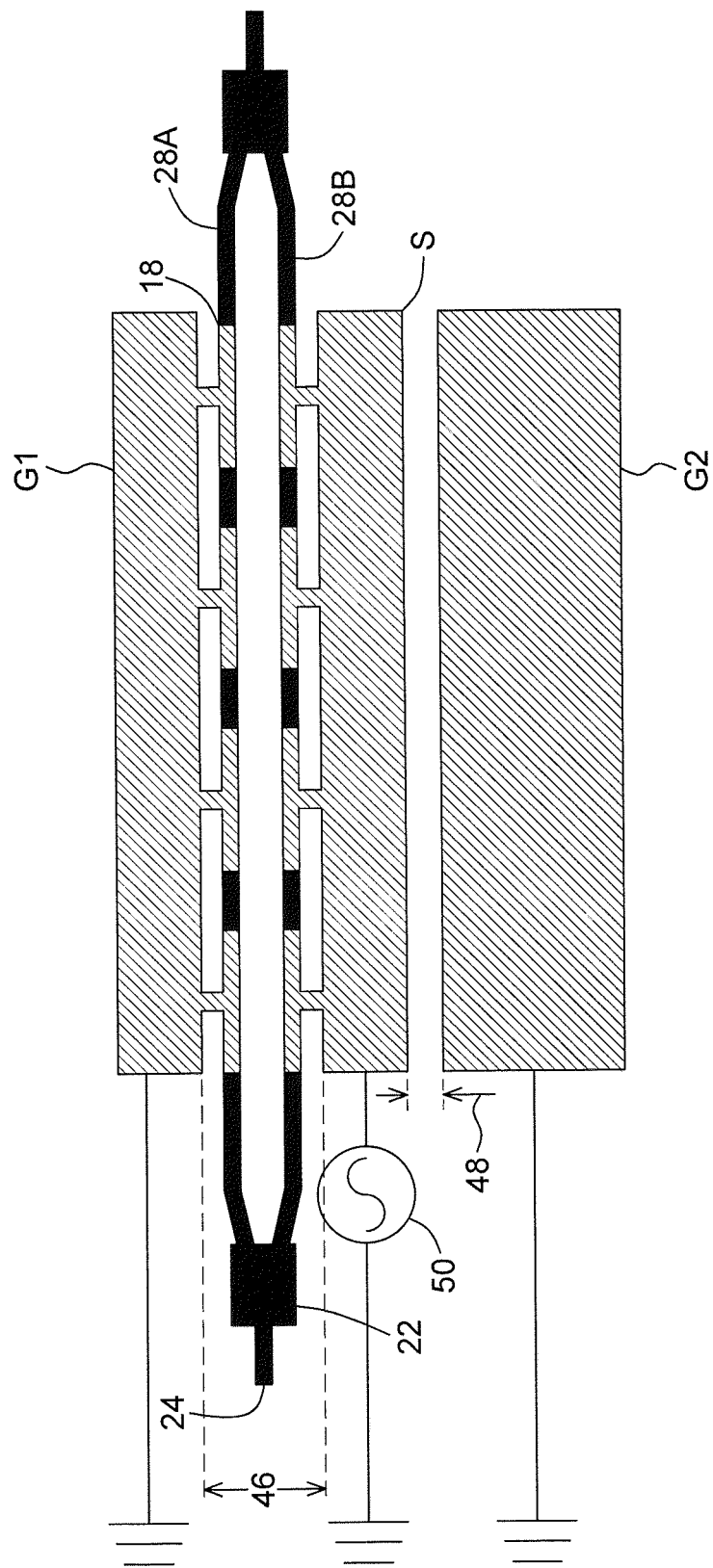
FIG. 5 schematic top view of an asymmetrically-loaded Mach-Zehnder optical modulator according to one embodiment of the invention in which the second ground transmission line conductor has a different width than the first ground transmission line conductor, and the gap between the signal line and the second ground line is different than the gap between the signal line and the first ground line.

The second ground line G2, which is not loaded, may be judiciously designed to optimize waveguide properties, while still maintaining the advantage of electrical isolation from neighbouring devices and the environment. An example of this is illustrated in FIG. 5, which is a diagram of an alternate embodiment wherein the second ground transmission line conductor G2 has a different width than the first ground transmission line conductor G1, and the gap 48 between the signal transmission line conductor S and the second ground transmission line conductor G2 is different than the gap 46 between the signal transmission line conductor S and the first ground transmission line conductor. By altering the width of the S line and the gaps between S and G1, and S and G2 the total effective inductance per unit length and capacitance per unit length of the transmission line can be adjusted. These in turn are determining factors for the characteristic impedance and RF modal index of the transmission line. The characteristic impedance and modal index can therefore be optimized to provide, for example, favorable impedance match to the voltage source and advantageous velocity match to the optical waveguide mode, respectively.

The present invention maintains the advantages of single-end drive in terms of requiring only one signal line to connect to the optical modulator, which allows more compact packaging—particularly with multiple optical modulators on a single chip. However, the separate ground transmission line conductors G1 and G2 act as shields for the signal line S to minimize cross-talk and external interference.

The above disclosure sets forth a number of embodiments of the present invention described in detail with respect to the accompanying drawings.

Those skilled in this art will appreciate that various changes, modifications, other structural arrangements, and other embodiments could be practiced under the teachings of the present invention without departing from the scope of this invention as set forth in the following claims.

The invention claimed is:

1. A Mach-Zehnder optical modulator for modulating an input optical beam according to an electrical modulation signal, the Mach-Zehnder modulator comprising an optical structure dividing the input optical beam into two optical beam components propagating in two optical waveguides branches, respectively, and recombining said optical beam components downstream the optical waveguides branches, the Mach-Zehnder modulator further comprising a travelling wave electrode modulating a relative phase of the optical beam components, said travelling wave electrode comprising:
    (a) only one signal transmission line conductor, coupled to one of the optical waveguide branches and conveying the input electrical signal;
    (b) a first ground transmission line conductor coupled to the other one of the optical waveguide branches and providing a first return path for the input electrical signal; and
    (c) a second ground transmission line conductor providing a second return path for the input electrical signal;
    (d) a plurality of pairs of waveguide electrodes, the waveguide electrodes of each pair being positioned adjacent a corresponding one of the optical waveguide branches and being electrically connected to the signal transmission line conductor and to the first ground transmission line conductor, respectively,
    wherein the signal transmission line conductor is positioned between the first and second ground transmission line conductors, and the first and second optical waveguide branches are positioned between the signal transmission line conductor and the first ground transmission line conductor.

2. The Mach-Zehnder optical modulator according to claim 1, wherein the first and second ground transmission line conductors have different widths.

3. The Mach-Zehnder optical modulator according to claim 1, wherein the second ground transmission line conductor has a width greater than a width of the first ground transmission line conductor.

4. The Mach-Zehnder optical modulator of claim 1 wherein a gap between the signal transmission line conductor and the second ground transmission line conductor is different than a gap between the signal transmission line conductor and the first ground transmission line conductor.

* * * * *